US012770912B2

(12) United States Patent
Sakamoto et al.

(10) Patent No.: US 12,770,912 B2
(45) Date of Patent: Oct. 20, 2026

(54) SOLID-STATE BATTERY ELECTROLYTE HAVING INCREASED STABILITY TOWARDS CATHODE MATERIALS

(71) Applicant: The Regents of The University of Michigan, Ann Arbor, MI (US)

(72) Inventors: Jeffrey Sakamoto, Ann Arbor, MI (US); Travis Thompson, Ann Arbor, MI (US); Nathan Taylor, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 11 days.

(21) Appl. No.: 16/761,592

(22) PCT Filed: Nov. 6, 2018

(86) PCT No.: PCT/US2018/059358

§ 371 (c)(1),
(2) Date: May 5, 2020

(87) PCT Pub. No.: WO2019/094359

PCT Pub. Date: May 16, 2019

(65) Prior Publication Data

US 2020/0280093 A1 Sep. 3, 2020

Related U.S. Application Data

(60) Provisional application No. 62/582,553, filed on Nov. 7, 2017.

(51) Int. Cl.
*H01M 10/0562* (2010.01)
*C04B 35/499* (2006.01)
(Continued)

(52) U.S. Cl.
CPC ....... *H01M 10/0562* (2013.01); *C04B 35/499* (2013.01); *H01M 4/0471* (2013.01);
(Continued)

(58) Field of Classification Search
CPC ......... H01M 10/0562; H01M 10/0525; H01M 4/0471; H01M 4/131; H01M 4/134;
(Continued)

(56) References Cited

U.S. PATENT DOCUMENTS

2014/0060723 A1* 3/2014 Herle .................... C04B 37/001 156/89.12
2014/0377665 A1 12/2014 Yoshida et al.
(Continued)

FOREIGN PATENT DOCUMENTS

CN 102549830 A 7/2012
CN 106159318 A 11/2016
(Continued)

OTHER PUBLICATIONS

Kihira et al. ("Effect of Simulataneous Substitution of Alkali Earth Metals and Nb in Li7La3Z¬-2O12 on Lithium-Ion Conductivity", ECS Electrochemistry Letters, 2013, 2(7), p. A56-A59) (Year: 2013).*

(Continued)

*Primary Examiner* — Haroon S. Sheikh
(74) *Attorney, Agent, or Firm* — Quarles & Brady LLP

(57) ABSTRACT

Disclosed are electrochemical devices, such as lithium ion battery electrodes, lithium ion conducting solid-state electrolytes, and solid-state lithium ion batteries including these electrodes and solid-state electrolytes. Also disclosed are composite electrodes for solid state electrochemical devices. The composite electrodes include one or more separate phases within the electrode that provide electronic and ionic conduction pathways in the electrode active material phase.
(Continued)

A method for forming a composite electrode for an electrochemical device is also disclosed. One example method comprises (a) forming a mixture comprising (i) a lithium host material, and (ii) a solid-state conductive material comprising a ceramic material having a crystal structure and a dopant in the crystal structure; and (b) sintering the mixture, wherein the dopant is selected such that the solid-state conductive material retains the crystal structure during sintering with the lithium host material.

21 Claims, 4 Drawing Sheets

(51) Int. Cl.

| | |
|---|---|
| ***H01M 4/04*** | (2006.01) |
| ***H01M 4/131*** | (2010.01) |
| ***H01M 4/134*** | (2010.01) |
| ***H01M 4/36*** | (2006.01) |
| ***H01M 4/505*** | (2010.01) |
| ***H01M 4/525*** | (2010.01) |
| ***H01M 10/0525*** | (2010.01) |
| ***H01M 10/0567*** | (2010.01) |

(52) U.S. Cl.

CPC ........... *H01M 4/131* (2013.01); *H01M 4/134* (2013.01); *H01M 4/364* (2013.01); *H01M 4/505* (2013.01); *H01M 4/525* (2013.01); *H01M 10/0525* (2013.01); *H01M 10/0567* (2013.01); *C04B 2235/3255* (2013.01)

(58) Field of Classification Search

CPC ...... H01M 4/364; H01M 4/505; H01M 4/525; C04B 35/499; C04B 2235/3255

See application file for complete search history.

(56) References Cited

U.S. PATENT DOCUMENTS

| | | | | |
|---|---|---|---|---|
| 2015/0056520 | A1* | 2/2015 | Thokchom | H01M 4/0471 429/246 |
| 2015/0099190 | A1* | 4/2015 | Holme | C04B 35/4885 429/322 |
| 2016/0211498 | A1 | 7/2016 | Hyun | |
| 2017/0179521 | A1 | 6/2017 | Sakamoto et al. | |
| 2017/0338522 | A1* | 11/2017 | Hu | H01M 4/381 |
| 2018/0013171 | A1 | 1/2018 | Sakamoto et al. | |
| 2018/0301754 | A1* | 10/2018 | Badding | H01M 10/052 |
| 2019/0084887 | A1 | 3/2019 | Yamamoto | |
| 2020/0075960 | A1* | 3/2020 | Wachsman | H01M 4/38 |

FOREIGN PATENT DOCUMENTS

| | | | |
|---|---|---|---|
| CN | 106848392 | A | 6/2017 |
| WO | 2015076944 | | 5/2015 |
| WO | 2016168723 | A1 | 10/2016 |
| WO | 2017135553 | A1 | 8/2017 |

OTHER PUBLICATIONS

Kobayashi et al. (“Electrochemical performance of an all-solid-state lithium ion battery with garnet-type oxide electrolyte ”, Journal of Power Sources, 2012, 202:332-335.) (Year: 2012).*

Rosero-Navarro, Nataly C., Taira Yamashita, Akira Miura, Mikio Higuchi, Kiyoharu Tadanaga. “Effect of sintering additives on relative density an Li-ion conductivity of Nb-doped Li7La3ZrO12 solid electrolyte.” Journal of the American Ceramic Society, vol. 100, No. 1, 2017, pp. 276-285. (Year: 2017).*

Ren et al., Chemical compatibility between garnet-like solid state electrolyte Li6.75La3Zr1.75Ta0.25012 and major commercial lithium battery cathode materials, 2016, 2:256-264.

Machine Translation of WO 2017135553.

Bak et al., Structural Changes and Thermal Stability of Charged LiNixMnyCozO2 Cathode Materials Studied by Combined In Situ Time-Resolved XRD and Mass Spectroscopy, ACS Applied Materials & Interfaces, 2014, 6(24): 22594-22601.

Mukhopadhyay et al., Structure and Stoichiometry in Supervalent Doped Li7La3Zr2012, Chemistry of Materials, 2015, 27(10):3658-3665.

Murugan et al., Fast Lithium Ion Conduction in Garnet-Type Li7La3Zr2O12, Angew. Chem. Int. Ed., 2007, 46:7778-7781.

Ohta et al., Co-Sinterable Lithium Garnet-Type Oxide Electrolyte with Cathode for All-Solid-State Lithium Ion Battery, Journal of Power Sources, 2014, 265:40-44.

Shin et al., Synergistic Multi-Doping Effects on the Li7La3Zr2O12 Solid Electrolyte for Fast Lithium Ion Conduction, Scientific Reports, 2015, 5(1):1-9.

Thangadurai et al., Li6ALa2Ta2O12 (A=Sr, Ba): Novel Garnet-Like Oxides for Fast Lithium Ion Conduction, Advanced Functional Materials, 2005, 15(1): 107-112.

Thangadurai et al., Recent Progress in Solid Oxide and Lithium Ion Conducting Electrolytes Research, Ionics, 2006, 12:81-92.

Thompson et al., A Tale of Two Sites: On Defining the Carrier Concentration in Garnet-Based Ionic Conductors for Advanced Li Batteries, Advanced Energy Materials, 2015, 1500096, 9 pages.

Xu et al., Mechanisms of Li+ Transport in Garnet-Type Cubic Li3+xLa3M2012 (M=Te, Nb, Zr), Physical Review B, 2012, 85:052301, 5 pages.

PCT International Search Report and Written Opinion, PCT/US2018/059358, Jan. 28, 2019, 21 pages.

Machine Translation of CN106848392A.

Machine Translation of CN106159318A.

Machine Translation of CN102549830A.

Hu et al., High Li-ion conductivity of Al-doped Li7La3Zr2O12 synthesized by solid-state reaction, Ceramics International, vol. 42, Issue 10, pp. 12156-12160, 2016.

Ren et al., “Chemical compatibility between garnet-like solid state electrolyte Li6.75La3Zr1.75Ta0.25O12 and major commercial lithium battery cathode materials”, Journal of Materiomics, pp. 256-264, 2016.

* cited by examiner

SOLID-STATE BATTERY ELECTROLYTE HAVING INCREASED STABILITY TOWARDS CATHODE MATERIALS

CROSS-REFERENCE TO RELATED APPLICATIONS

This application represents the national stage entry of PCT International Application No. PCT/US2018/059358 filed on Nov. 6, 2018, which claims priority to U.S. Patent Application No. 62/582,553 filed on Nov. 7, 2017, both of which are incorporated herein by reference for all purposes.

STATEMENT REGARDING FEDERALLY SPONSORED RESEARCH

This invention was made with government support under grant DE-AR0000653 awarded by the Department of Energy. The government has certain rights in the invention.

BACKGROUND OF THE INVENTION

1. Field of the Invention

This invention relates to electrochemical devices, such as lithium ion battery electrodes, and solid-state lithium ion batteries including these electrodes and solid-state electrolytes. This invention also relates to methods for making such electrochemical devices. In particular, the invention relates to a composite electrode for a solid state electrochemical device wherein the electrode provides electronic and ionic conduction pathways in the electrode active material phase.

2. Description of the Related Art

Lithium ion (Li-ion) battery technology has advanced significantly and has a market size projected to be $10.5 billion by 2019. Current state of the art lithium ion batteries comprise two electrodes (an anode and a cathode), a separator material that keeps the electrodes from touching but allows $Li^+$ ions through, and an electrolyte (which is an organic liquid with lithium salts). During charge and discharge, $Li^+$ ions are exchanged between the electrodes.

State-of-the-art (SOA) Li-ion technology is currently used in low volume production plug-in hybrid and niche high performance vehicles; however, widespread adoption of electrified powertrains requires 25% lower cost, four times higher performance, and safer batteries without the possibility of fire. Thus, future energy storage demands safer, cheaper and higher performance means of energy storage.

Currently, the liquid electrolyte used in SOA Li-ion batteries is not compatible with advanced battery concepts, such as the use of a lithium metal anode or high voltage cathodes. Furthermore, the liquid utilized in SOA Li-ion batteries is flammable and susceptible to combustion upon thermal runaway. One strategy is to develop solid state batteries, where the liquid electrolyte is replaced with a solid material that is conductive to $Li^+$ ions and can offer 3-4 times the energy density while reducing the battery pack cost by about 20%. The use of a solid electrolyte to replace the liquid used in the SOA enables advanced cell chemistries while simultaneously eliminating the risk of combustion. Several solid-electrolytes have been identified including nitrogen doped lithium phosphate (LiPON) or sulfide based glasses, and companies have been formed to commercialize these types of technologies. While progress has been made towards the performance of cells of these types, large scale manufacturing has not been demonstrated since LiPON must be vapor deposited and sulfide glasses form toxic $H_2S$ upon exposure to ambient air. Thus, special manufacturing techniques are required for those systems.

Super conducting oxides (SCO) have also been proposed for use in a solid-state electrolyte. Although several oxide electrolytes are reported in the literature, selection of a particular material is not trivial since several criteria must be simultaneously satisfied. The following metrics were identified on a combination of the SOA Li-ion battery technology baseline: (1) conductivity >0.2 mS/cm, comparable to SOA Li-ion battery technology, (2) negligible electronic conductivity, (3) electrochemical stability against high voltage cathodes and lithium metal anodes, (4) high temperature stability, (5) reasonable stability in ambient air and moisture, and (6) ability to be manufactured at a thicknesses of <50 microns. Until recently, no SCO simultaneously met the above criteria.

In 2007, high lithium ion conductivity in the garnet family of super conducting oxides was identified [see, Thangadurai, et al., *Adv. Funct. Mater.* 2005, 15, 107; and Thangadurai, et al., *Ionics* 2006, 12, 81], maximizing with the SCO garnet based on $Li_7La_3Zr_2O_{12}$ (LLZO) [see, Murugan, et al., *Angew. Chem. Inter. Ed.* 2007, 46, 7778]. Since then, it has been shown that LLZO can meet all of the criteria necessary for a solid-electrolyte outlined above.

Several compositions in the garnet family of materials are known to exhibit lithium-ion conduction with the general formula $Li_{3+a}M_2Re_3O_{12}$ (where a=0-3, M=a metal with +4, +5, or +6 valence, and Re=a rare earth element with a +3 valence) [see, Xu, et al., *Phys. Rev. B* 2012, 85, 052301]. T. Thompson, A. Sharafi, M. D. Johannes, A. Huq, J. L. Allen, J. Wolfenstine, J. Sakamoto, *Advanced Energy Materials* 2015, 11, 1500096, identified which compositions, based on lithium content, exhibit maximal lithium-ion conductivity. LLZO is a particularly promising family of garnet compositions.

In a lithium-ion battery with a liquid electrolyte, a cast cathode electrode may comprise cathode particles, polymeric binder (typically polyvinylidene difluoride), and conductive additive (typically acetylene black). Electron transport occurs between the cathode particles by way of the conductive additive, and the cathode particles are wet by the liquid electrolyte that provides an ionic pathway for $Li^+$ ions to transport into the cathode particles. In a solid state battery, this cathode structure can be replaced with a composite cathode comprising a lithium ion conducting solid electrolyte for $Li^+$ transport, an oxide cathode active material phase, and an electronically conductive phase. The solid state composite cathode provides significant transport allowing for facile movement of ions and electrons to the cathode active material phase.

Some solid-state cathode research has focused on replacing the current SOA Li-ion cathode, which has a liquid electrolyte that provides facile transport of Li ions to individual cathode particles. Thin film type LiPON (nitrogen doped lithium phosphate) batteries have been successfully produced with <10 micron cathode layers but at low areal loading. To produce all solid-state battery replacements for liquid electrolyte lithium-ion batteries with areal capacities of 1-5 $mAh/cm^2$, cathode layers must be up to 100 microns in thickness. Commonly used cathodes such as the layered type (e.g., lithium cobalt oxide—$LiCoO_2$—LCO, and lithium nickel cobalt manganese oxide—$LiNiCoMnO_2$—NMC), olivine, or spinel, lack sufficient ionic and electronic conductivities to enable cathodes of this thickness. As such, areal capacities of 1.0-5.0 $mAh/cm^2$ can only be achieved in all solid-state batteries with a composite system in which there are one or more discrete phases conducting Li ions and electrons in addition to the cathode phase.

What is needed therefore is a composite electrode with one or more separate phases within the electrode that provide electronic and ionic conduction pathways in the electrode active material phase. In particular, what is needed is a solid-electrolyte material which acts to increase the ionic conductivity of the composite electrode and which does not undergo undesirable crystal structure changes during co-sintering with the electrode active material.

SUMMARY OF THE INVENTION

The foregoing needs can be addressed by a composite electrode of the present disclosure. The electrode may be a cathode or an anode. The electrode comprises a lithium host material having a structure (which may be porous); and a solid-state conductive electrolyte material of the present disclosure filling at least part (or all) of the structure.

In one aspect, the invention provides an electrode for an electrochemical device. The electrode comprises a lithium host material; and a solid-state conductive material comprising a ceramic material having a crystal structure and a dopant in the crystal structure, wherein the solid-state conductive material retains the crystal structure during sintering with the lithium host material. In one form, the crystal structure having the dopant has a higher fraction of a cubic structure after sintering relative to the crystal structure having no dopant. In one form, the crystal structure having the dopant has a lower fraction of a tetragonal structure after sintering relative to the crystal structure having no dopant.

The dopant may be a transition metal cation. The dopant may be pentavalent or hexavalent. The dopant may comprise tantalum. The dopant may comprise niobium. The dopant can be present in the crystal structure at 1 to 20 weight percent based on a total weight of chemical elements in the crystal structure.

In one form, the solid-state conductive material has a lithium ion conductivity that is greater than $10^{-5}$ S/cm at 23° C. In one form, the solid-state conductive material has a lithium ion conductivity that is greater than $10^{-4}$ S/cm at 23° C.

The solid-state conductive material can have a formula of $Li_wA_xM_2Re_{3-y}O_z$

- wherein w is 5-7.5,
- wherein A is selected from B, Ga, In, Zn, Cd, Y, Sc, Mg, Ca, Sr, Ba, Co, Fe, and any combination thereof,
- wherein x is 0-2,
- wherein M is selected from Zr, Hf, Nb, Ta, Mo, W, Sn, Ge, Si, Sb, Se, Te, and any combination thereof,
- wherein Re is selected from lanthanide elements, actinide elements, and any combination thereof,
- wherein y is 0.01-0.75,
- wherein z is 10.875-13.125, and
- wherein the crystal structure is a garnet-type or garnet-like crystal structure. In one example embodiment of the solid-state conductive material, M is a combination of Zr and Ta (e.g., doping of a $Li_7La_3Zr_2O_{12}$ structure on the Zr site with Ta, such as $Li_{6.5}La_3Zr_{1.5}Ta_{0.5}O_{12}$). In another example embodiment of the solid-state conductive material, M is a combination of Zr and Nb (e.g., doping of a $Li_7La_3Zr_2O_{12}$ structure on the Zr site with Nb).

The electrode may be a cathode for the electrochemical device, and the lithium host material may be selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel.

The lithium host material can have a formula $LiNi_aMn_bCo_cO_2$, wherein a+b+c=1, and wherein a:b:c=1:1:1 (NMC 111), 4:3:3 (NMC 433), 5:2:2 (NMC 522), 5:3:2 (NMC 532), 6:2:2 (NMC 622), or 8:1:1 (NMC 811). The lithium host material may be selected from $LiCoO_2$, $LiNiO_2$, $Li(NiCoAl)_{1.0}O_2$, $Li(MnNi)_{2.0}O_4$, $LiFePO_4$, $LiCoPO_4$, $LiNiPo_4$, or $LiVO_3$, and any combination thereof.

The electrode may be an anode for the electrochemical device, and the lithium host material may be selected from the group consisting of graphite, lithium titanium oxides, hard carbon, tin and cobalt alloy, or silicon and carbon.

The electrode may further comprise a conductive additive. The conductive additive may be selected from graphite, carbon black, acetylene black, Ketjen black, channel black, furnace black, lamp black, thermal black, conductive fibers, metallic powders, conductive whiskers, conductive metal oxides, and mixtures thereof.

In another aspect, the invention provides a method for forming an electrode for an electrochemical device. The method comprises the steps of: (a) forming a mixture comprising (i) a lithium host material, and (ii) a solid-state conductive material comprising a ceramic material having a crystal structure and a dopant in the crystal structure; and (b) sintering the mixture, wherein the dopant is selected such that the solid-state conductive material retains the crystal structure during sintering with the lithium host material.

In the method, step (a) can comprise casting a slurry including the mixture on a surface to form a layer, and step (b) comprises sintering the layer. In the method, step (b) can further comprise sintering the mixture at a temperature between 20° C. and 1400° C. In the method, step (b) can further comprise sintering the mixture between 1 minute and 48 hours. In the method, step (b) can comprise sintering the mixture at a temperature in a range of 600° C. to 1100° C.

In the method, the dopant may be pentavalent or hexavalent. In the method, the dopant can be tantalum. In the method, the dopant can be niobium. The dopant can be present in the crystal structure at 1 to 20 weight percent based on a total weight of chemical elements in the crystal structure.

In the method, the solid-state conductive material can have a formula of $Li_wA_xM_2Re_{3-y}O_z$

- wherein w is 5-7.5,
- wherein A is selected from B, Ga, In, Zn, Cd, Y, Sc, Mg, Ca, Sr, Ba, Co, Fe, and any combination thereof,
- wherein x is 0-2,
- wherein M is selected from Zr, Hf, Nb, Ta, Mo, W, Sn, Ge, Si, Sb, Se, Te, and any combination thereof,
- wherein Re is selected from lanthanide elements, actinide elements, and any combination thereof,
- wherein y is 0.01-0.75,
- wherein z is 10.875-13.125, and
- wherein the crystal structure is a garnet-type or garnet-like crystal structure. In one example embodiment of the solid-state conductive material, M is a combination of Zr and Ta (e.g., doping of a $Li_7La_3Zr_2O_{12}$ structure on the Zr site with Ta, such as $Li_{6.5}La_3Zr_{1.5}Ta_{0.5}O_{12}$). In another example embodiment of the solid-state conductive material, M is a combination of Zr and Nb (e.g., doping of a $Li_7La_3Zr_2O_{12}$ structure on the Zr site with Nb).

In the method, the electrode may be a cathode for the electrochemical device, and the lithium host material may be selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel.

In the method, the lithium host material can have a formula $LiNi_aMn_bCo_cO_2$, wherein a+b+c=1, and wherein a:b:c=1:1:1 (NMC 111), 4:3:3 (NMC 433), 5:2:2 (NMC 522), 5:3:2 (NMC 532), 6:2:2 (NMC 622), or 8:1:1 (NMC 811). The lithium host material may be selected from $LiCoO_2$, $LiNiO_2$, $Li(NiCoAl)_{1.0}O_2$, $Li(MnNi)_{2.0}O_4$, $LiFePO_4$, $LiCoPO_4$, $LiNiPo_4$, or $LiVO_3$, and any combination thereof.

In the method, the electrode may be an anode for the electrochemical device, and the lithium host material may be selected from the group consisting of graphite, lithium titanium oxides, hard carbon, tin and cobalt alloy, or silicon and carbon.

In the method, the electrode may further comprise a conductive additive. The conductive additive may be selected from graphite, carbon black, acetylene black, Ketjen black, channel black, furnace black, lamp black, thermal black, conductive fibers, metallic powders, conductive whiskers, conductive metal oxides, and mixtures thereof.

In another aspect, the invention provides an electrochemical device, such as a lithium ion battery or a lithium metal battery. The electrochemical device comprises a cathode, an anode, and a solid-state electrolyte configured to facilitate the transfer of lithium ions between the anode and the cathode. The cathode can comprise a lithium host material having a first structure (which may be porous). The anode can comprise a lithium metal, or a lithium host material having a second structure (which may be porous). A solid-state conductive material of the present disclosure fills at least part (or all) of the first structure in the lithium host material of the cathode and/or a second structure of the lithium host material of the anode (in the case of a lithium ion battery). The solid-state conductive material comprises a ceramic material having a crystal structure and a dopant in the crystal structure; and the dopant is selected such that the solid-state conductive material retains the crystal structure during sintering with the lithium host material.

In the electrochemical device, the crystal structure having the dopant can have a higher fraction of a cubic structure after sintering relative to the crystal structure having no dopant. In the electrochemical device, the crystal structure having the dopant can have a lower fraction of a tetragonal structure after sintering relative to the crystal structure having no dopant. In the electrochemical device, the dopant may be a transition metal cation. In the electrochemical device, the dopant may be pentavalent or hexavalent. In the electrochemical device, the dopant may be tantalum. In the electrochemical device, the dopant may be niobium. The dopant can be present in the crystal structure at 1 to 20 weight percent based on a total weight of chemical elements in the crystal structure.

In the electrochemical device, the solid-state conductive material can have a lithium ion conductivity that is greater than $10^{-5}$ S/cm at 23° C. The solid-state conductive material can have a lithium ion conductivity that is greater than $10^{-4}$ S/cm at 23° C. In the electrochemical device, the solid-state conductive material may have a formula of $Li_wA_xM_2Re_{3-y}O_z$ wherein w is 5-7.5, wherein A is selected from B, Ga, In, Zn, Cd, Y, Sc, Mg, Ca, Sr, Ba, Co, Fe, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0.01-0.75, wherein z is 10.875-13.125, and wherein the crystal structure is a garnet-type or garnet-like crystal structure. In one example embodiment of the solid-state conductive material, M is a combination of Zr and Ta (e.g., doping of a $Li_7La_3Zr_2O_{12}$ structure on the Zr site with Ta, such as $Li_{6.5}La_3Zr_{1.5}Ta_{0.5}O_{12}$). In another example embodiment of the solid-state conductive material, M is a combination of Zr and Nb (e.g., doping of a $Li_7La_3Zr_2O_{12}$ structure on the Zr site with Nb).

In the electrochemical device, the cathode can comprise the lithium host material and the solid-state conductive material, and the lithium host material may be selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel.

In the electrochemical device, the cathode can comprise the lithium host material and the solid-state conductive material, and the lithium host material can have a formula $LiNi_aMn_bCo_cO_2$, wherein a+b+c=1, and wherein a:b:c=1:1:1 (NMC 111), 4:3:3 (NMC 433), 5:2:2 (NMC 522), 5:3:2 (NMC 532), 6:2:2 (NMC 622), or 8:1:1 (NMC 811).

In the electrochemical device, the cathode can comprise the lithium host material and the solid-state conductive material, and the lithium host material may be selected from $LiCoO_2$, $LiNiO_2$, $Li(NiCoAl)_{1.0}O_2$, $Li(MnNi)_{2.0}O_4$, $LiFePO_4$, $LiCoPO_4$, $LiNiPo_4$, or $LiVO_3$, and any combination thereof.

In the electrochemical device, the anode can comprise the lithium host material and the solid-state conductive material, and the lithium host material may be selected from the group consisting of graphite, lithium titanium oxides, hard carbon, tin and cobalt alloy, or silicon and carbon.

LLZO is one of the most attractive solid electrolytes for all solid-state batteries. Al:LLZO (LLZO doped with aluminum to stabilize the cubic crystal structure at room temperature) is attractive due to low cost, high ionic conductivity, and stability towards metallic lithium. To produce an oxide-based composite cathode, a mixture of cathode particles, electrolyte particles, and optionally conductive additive particles must be co-sintered at temperatures of 20° C. to 1400° C. for densification. Our work on composite cathodes has revealed a distinct mechanism whereby Al:LLZO reacts during co-sintering with common cathode materials, such as lithium cobalt oxide (LCO) and lithium nickel cobalt manganese oxide (NMC). Reaction of the aluminum with the cathode material leaves the LLZO undoped and susceptible to lithium uptake. The result is the conversion of the cubic LLZO (la-3d space group) structure to the tetragonal LLZO ($l4_1lacd$ space group) structure, which is undesirable due to the low intrinsic lithium ion conductivity of tetragonal LLZO.

The invention improves the composite electrode through chemical modification of a lithium-ion conducting solid electrolyte material which maintains significant ionic conductivity after co-sintering with a lithium host material.

Doping of the $Li_7La_3Zr_2O_{12}$ structure on the Zr site with a transition metal cation (preferably pentavalent or hexavalent) maintains significant ionic conduction after co-sintering with the lithium host material. Doping of the $Li_7La_3Zr_2O_{12}$ structure with other transition metal cations (such as cobalt) can also provide electronic conduction. The resulting solid state composite electrode can operate as a mixed ionic/electronic conductor, eliminating the need for a separate phase that provides an electrical pathway from the current collector to electrode active material particles.

These and other features, aspects, and advantages of the present invention will become better understood upon consideration of the following detailed description, drawings and appended claims.

DETAILED DESCRIPTION OF THE INVENTION

Figure 1:
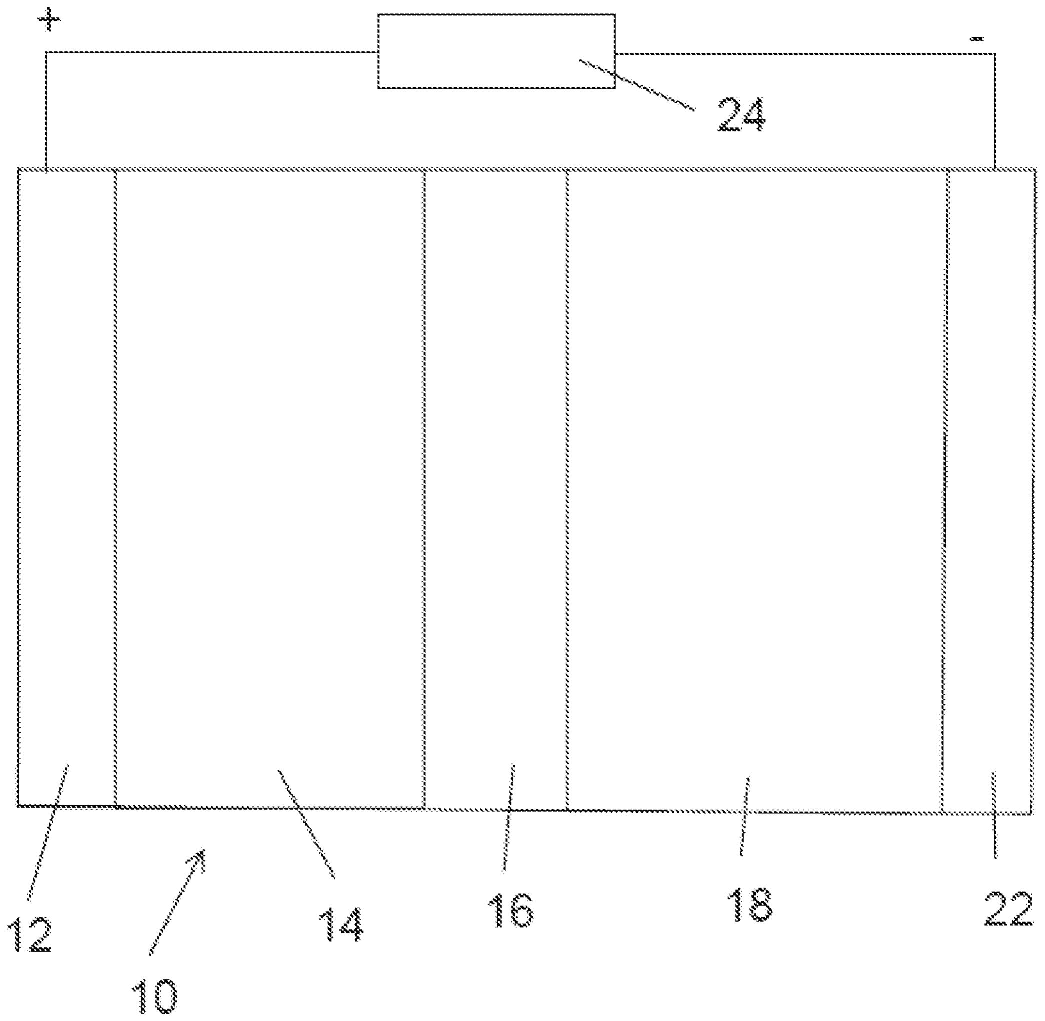
FIG. 1 is a schematic of a lithium ion battery.

In one non-limiting example application, an electrode according to embodiments of the invention can be used in a lithium ion battery as depicted in FIG. 1. The lithium ion battery 10 of FIG. 1 includes a current collector 12 (e.g., aluminum) in contact with a cathode 14. A solid state electrolyte 16 is arranged between the cathode 14 and an anode 18, which is in contact with a current collector 22 (e.g., aluminum). The current collectors 12 and 22 of the lithium ion battery 10 may be in electrical communication with an electrical component 24. The electrical component 24 could place the lithium ion battery 10 in electrical communication with an electrical load that discharges the battery or a charger that charges the battery.

A suitable active material for the cathode 14 of the lithium ion battery 10 is a lithium host material capable of storing and subsequently releasing lithium ions. An example cathode active material is a lithium metal oxide wherein the metal is one or more of aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiCoMnO_2$ (NMC), $LiNiO_2$ (LNO), $LiNi_xCo_yO_2$, $LiMn_xCo_yO_2$, $LiMn_xNi_yO_2$, $LiMn_xNi_yO_4$, $LiNi_xCo_yAl_zO_2$, $LiNi_{1/3}Mn_{1/3}Co_{1/3}O_2$ and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on delithiation and cycling performance of the cathode materials. The cathode active material can be a mixture of any number of these cathode active materials.

In some non-limiting embodiments, the lithium host material is selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel. In some non-limiting embodiments, the lithium host material has a formula $LiNi_aMn_bCo_cO_2$, wherein a+b+c=1, and wherein a:b:c=1:1:1 (NMC 111), 4:3:3 (NMC 433), 5:2:2 (NMC 522), 5:3:2 (NMC 532), 6:2:2 (NMC 622), or 8:1:1 (NMC 811). In some non-limiting embodiments, the lithium host material is selected from $LiCoO_2$, $LiNiO_2$, $Li(NiCoAl)_{1.0}O_2$, $Li(MnNi)_{2.0}O_4$, $LiFePO_4$, $LiCoPO_4$, $LiNiPo_4$, or $LiVO_3$, and any combination thereof.

The cathode 14 may include a conductive additive. Many different conductive additives, e.g., Co, Mn, Ni, Cr, Al, or Li, may be substituted or additionally added into the structure to influence electronic conductivity, ordering of the layer, stability on delithiation and cycling performance of the cathode materials. Other suitable conductive additives include graphite, carbon black, acetylene black, Ketjen black, channel black, furnace black, lamp black, thermal black, conductive fibers, metallic powders, conductive whiskers, conductive metal oxides, and mixtures thereof.

A suitable active material for the anode 18 of the lithium ion battery 10 is a lithium host material capable of incorporating and subsequently releasing the lithium ion such as graphite, a lithium metal oxide (e.g., lithium titanium oxide), hard carbon, a tin/cobalt alloy, tin/aluminum alloy, or silicon/carbon. The anode active material can be a mixture of any number of these anode active materials. The anode 18 may include one or more of the conductive additives described above.

A suitable solid state electrolyte 16 of the lithium ion battery 10 includes an electrolyte material having the formula $Li_uRe_vM_wA_xO_y$, wherein

- Re can be any combination of elements with a nominal valance of +3 including La, Nd, Pr, Pm, Sm, Sc, Eu, Gd, Tb, Dy, Y, Ho, Er, Tm, Yb, and Lu;
- M can be any combination of metals with a nominal valance of +3, +4, +5 or +6 including Zr, Ta, Nb, Sb, W, Hf, Sn, Ti, V, Bi, Ge, and Si;
- A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;
- u can vary from 3-7.5;
- v can vary from 0-3;
- w can vary from 0-2;
- x is 0-2; and
- y can vary from 11-12.5.

Figure 2:
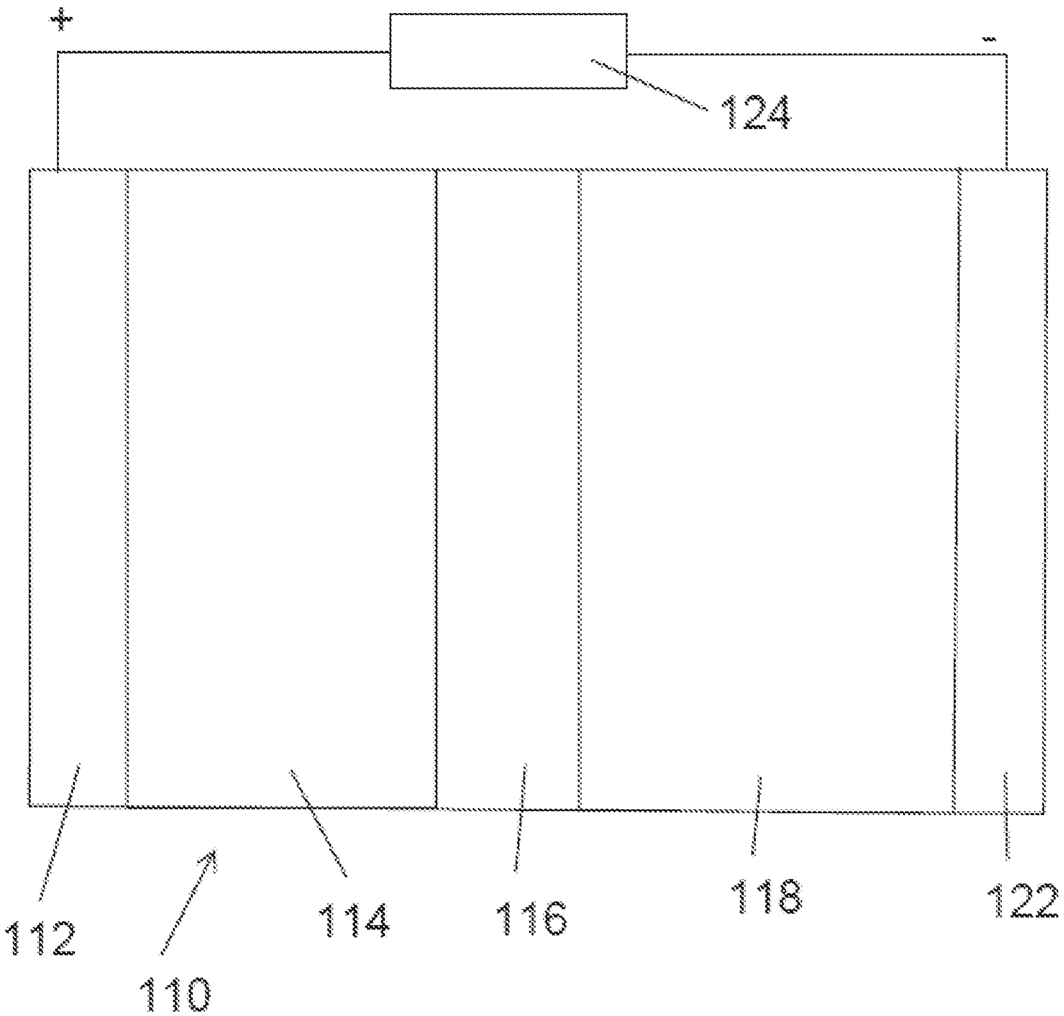
FIG. 2 is a schematic of a lithium metal battery.

In another non-limiting example application, an electrode according to embodiments of the invention can be used in a lithium metal battery as depicted in FIG. 2. The lithium metal battery 110 of FIG. 2 includes a current collector 112 in contact with a cathode 114. A solid state electrolyte 116 is arranged between the cathode 114 and an anode 118, which is in contact with a current collector 122. The current collectors 112 and 122 of the lithium metal battery 110 may be in electrical communication with an electrical component 124. The electrical component 124 could place the lithium metal battery 110 in electrical communication with an electrical load that discharges the battery or a charger that charges the battery. A suitable active material for the cathode 114 of the lithium metal battery 110 is one or more of the lithium host materials listed above, or porous carbon (for a lithium air battery), or a sulfur containing material (for a lithium sulfur battery). The cathode 114 may include one or more of the conductive additives described above. A suitable active material for the anode 118 of the lithium metal battery 110 is lithium metal. A suitable solid state electrolyte material for the solid state electrolyte 116 of the lithium metal battery 110 is one or more of the solid state electrolyte materials listed above.

The present invention provides embodiments of an electrode that provide improved electronic and ionic conduction pathways in the electrode active material phase (e.g., lithium host material) of a cathode or an anode suitable for use in the lithium ion battery 10 of FIG. 1 or the lithium metal battery 110 of FIG. 2. In one non-limiting example, we describe how dopant control within the garnet-LLZO solid electrolyte system can dramatically improve the stability of the high ionic conductivity cubic phase when co-sintering with common cathode materials.

Transition metal (e.g., Ta, Nb) doped LLZO can be produced by direct solid state reaction of transition metal oxides or a transition metal and LLZO during synthesis. In another embodiment, one or more additional transition metal cations (such as cobalt) can be diffused into the LLZO at a temperature (e.g., 600-1000° C.) from a transition metal or transition metal oxide species in the gas phase. Although tantalum and niobium are used as examples, it is expected that other dopants including transition metal cations, preferably pentavalent or hexavalent, can similarly prevent the conversion of cubic LLZO to tetragonal LLZO during co-sintering of LLZO with lithium host materials.

Composite Electrodes

In one embodiment, the invention provides a composite electrode for an electrochemical device. The electrode may be a cathode or an anode. The electrode comprises a lithium host material having a structure (which may be porous); and a solid-state conductive material comprising a ceramic material having a crystal structure and a dopant in the crystal structure. The dopant is selected such that the solid-state conductive material retains the crystal structure during sintering with the lithium host material.

In a composite electrode of the present disclosure, one non-limiting example solid-state conductive material is $Li_{6.5}La_3Zr_{1.5}Ta_{0.5}O_{12}$, in which the dopant level of tantalum is 12.5 wt. % $Ta_2O_5$ or 10.3 wt. % Ta elemental. The dopant may be present in the crystal structure of the solid-state conductive material at 0.05 to 20 weight percent based on a total weight of the chemical elements in the crystal structure, or the dopant may be present in the crystal structure at greater than 0.01 weight percent based on a total weight of the chemical elements in the crystal structure, or the dopant may be present in the crystal structure at 1 to 20 weight percent based on a total weight of the chemical elements in the crystal structure, or the dopant may be present in the crystal structure at 5 to 15 weight percent based on a total weight of the chemical elements in the crystal structure. For example, transition metal doping of garnet LLZO phase can ensure that ionic conductivity is minimally changed. Tantalum and niobium, in particular, readily dope the LLZO structure. The transition metal cation dopant (e.g., tantalum and niobium) may be from any appropriate transition metal containing source.

Electrochemical Devices

In one embodiment, the invention provides an electrochemical device, such as the lithium ion battery 10 of FIG. 1 or the lithium metal battery 110 of FIG. 2. The electrochemical device comprises a cathode, an anode, and a solid-state electrolyte configured to facilitate the transfer of ions between the anode and the cathode. The cathode can comprise a lithium host material having a first structure (which may be porous). The anode can comprise a lithium metal, or a lithium host material having a second structure (which may be porous).

In the electrochemical device, a solid-state conductive material comprising a ceramic material having a crystal structure and a dopant in the crystal structure fills at least part (or all) of the first structure in the lithium host material of the cathode and/or a second structure of the lithium host material of the anode (in the case of a lithium ion battery). Typically, the lithium host materials are sintered. The dopant is selected such that the solid-state conductive material retains the crystal structure during sintering with the lithium host material.

In some embodiments, the solid-state conductive material has lithium ion conductivity that is greater than $10^{-5}$ S/cm at 23 degrees Celsius, or that is greater than $10^{-4}$ S/cm at 23 degrees Celsius.

Methods for Forming a Composite Electrode

In one embodiment, the invention provides a method for forming a composite electrode for an electrochemical device. The method comprises: (a) forming a mixture comprising (i) a lithium host material, and (ii) a solid-state conductive material comprising a ceramic material having a crystal structure and a dopant in the crystal structure; and (b) sintering the mixture, wherein the dopant is selected such that the solid-state conductive material retains the crystal structure during sintering with the lithium host material. In certain non-limiting versions of the method, the mixture may be sintered at a temperature between 20 and 1400° C. for a time period between 1 minute and 48 hours, or between 1 minute and 1 hour.

In one non-limiting embodiment, the method may comprise casting a slurry including the mixture on a surface to form a layer, and step (b) may comprise sintering the layer. The slurry to be cast may include optional components. For example, the slurry may optionally include one or more sintering aids which melt and form a liquid that can assist in sintering of a cast slurry formulation of the invention via liquid phase sintering. Example sintering aids can be selected from boric acid, boric acid salts, boric acid esters, boron alkoxides phosphoric acid, phosphoric acid salts, phosphate acid esters, silicic acid, silicic acid salts, silanols, silicon alkoxides, aluminum alkoxides and mixtures thereof.

The slurry may optionally include a dispersant. One purpose of the dispersant is to stabilize the slurry and prevent the suspended active battery material particles from settling out. The dispersant may be selected from the group consisting of salts of lithium and a fatty acid. The fatty acid may be selected from lauric acid, myristic acid, palmitic acid, stearic acid, oleic acid, linoleic acid, linolenic acid, arachidic acid, and behenic acid.

The slurry may optionally include a plasticizer. The purpose of the plasticizer is to increase the workability of the as-cast tape. Preferably, the plasticizer is a naturally derived plant based oil. The plasticizer may be selected from the group consisting of coconut oil, castor oil, soybean oil, palm kernel oil, almond oil, corn oil, canola oil, rapeseed oil, and mixtures thereof.

The slurry formulation may optionally include a binder. Non-limiting examples of the binder include: poly(methylmethacrylate), poly(vinylacetate), polyvinyl alcohol, polyethyleneoxide, polyvinylpyrrolidone, polyvinyl ether, polyvinylchloride, polyacrylonitrile, polyvinylpyridine, styrene-butadiene rubber, acrylonitrile-butadiene rubber, polyethylene, polypropylene, ethylene-propylene-diene terpolymers (EPDM), cellulose, carboxymethylcellulose, starch, hydroxypropylcellulose, and mixtures thereof. The binder is preferably a non-fluorinated polymeric material.

The slurry may optionally include a solvent is useful in a slurry formulation to dissolve the binder and act as a medium for mixing the other additives. Any suitable solvents may be used for mixing the active battery material particles, dispersant, and binder into a uniform slurry. Suitable solvents may include alkanols (e.g., ethanol), nitriles (e.g., acetonitrile), alkyl carbonates, alkylene carbonates (e.g., propylene carbonate), alkyl acetates, sulfoxides, glycol ethers, ethers, N-methyl-2-pyrrolidone, dimethylformamide, dimethylacetamide, tetrahydrofuran, or a mixture of any of these solvents.

The slurry formulation may include other additives. For example, the cathode or anode active battery material particles may be mixed with other particles, such as conductive particles. Any conductive material may be used without particular limitation so long as it has suitable conductivity without causing chemical changes in the fabricated battery. Examples of conductive materials include graphite; carbon blacks such as carbon black, acetylene black, Ketjen black, channel black, furnace black, lamp black and thermal black; conductive fibers such as carbon fibers and metallic fibers; metallic powders such as aluminum powder and nickel powder; conductive whiskers such as zinc oxide and potassium titanate; conductive metal oxides such as titanium oxide; and polyphenylene derivatives.

Any suitable method may be used to mix the slurry components into a uniform slurry. Suitable mixing methods may include sonication, mechanical stirring, physical shaking, vortexing, ball milling, and any other suitable means.

After the uniform slurry is obtained, the formulation is cast on a substrate surface to form a cast tape layer. The substrate may include any stable and conductive metals suitable as a current collector for the battery. A suitable metallic substrate may include aluminum, copper, silver, iron, gold, nickel, cobalt, titanium, molybdenum, steel, zirconium, tantalum, and stainless steel. In one embodiment, the metal substrate is aluminum.

The slurry layer cast on the surface may have a thickness in the range of a few micrometers to a few centimeters. In one embodiment, the thickness of the cast slurry layer is in the range of 10 micrometers to 150 micrometers, preferably 10 micrometers to 100 micrometers. After the slurry is cast on the substrate surface to form a tape, the green tape can be dried and sintered to a composite electrode having a thickness in the range of 10 micrometers to 150 micrometers, preferably 20 micrometers to 100 micrometers, more preferably 50 micrometers to 100 micrometers. Optionally, multiple layers can be cast on top of one another. For example, the anode can be cast first on the metal substrate, followed by casting the solid electrolyte on the anode, and finally casting the cathode on the electrolyte. Alternatively, the cathode can be cast first on the metal substrate, followed by the solid electrolyte, and finally the anode. The multilayer green tape can be dried and sintered at a temperature in a range of 600° C. to 1100° C., or in a range of 800° C. to 1000° C., to achieve the necessary electrochemical properties.

EXAMPLE

The following Example has been presented in order to further illustrate the invention and is not intended to limit the invention in any way.

We have shown that replacement of the Al:LLZO (LLZO doped with Al to stabilize the cubic crystal structure at room temperature) with that of pentavalently doped LLZO, such as Ta:LLZO (LLZO doped with Ta to stabilize the cubic crystal structure at room temperature) or Nb:LLZO (LLZO doped with Nb to stabilize the cubic crystal structure at room temperature) prevents reaction of the LLZO electrolyte with the cathode phase. As such, the LLZO retains the cubic-LLZO structure at room temperature which is desirable for high lithium ion conductivity. Whereas Al:LLZO is unstable during co-sintering with NMC or LCO at 700° C., Ta:LLZO or Nb:LLZO are stable with both cathodes to processing temperatures >1000° C. This innovation is key in enabling processing of LLZO based composite cathodes for all solid-state batteries.

Figure 3:
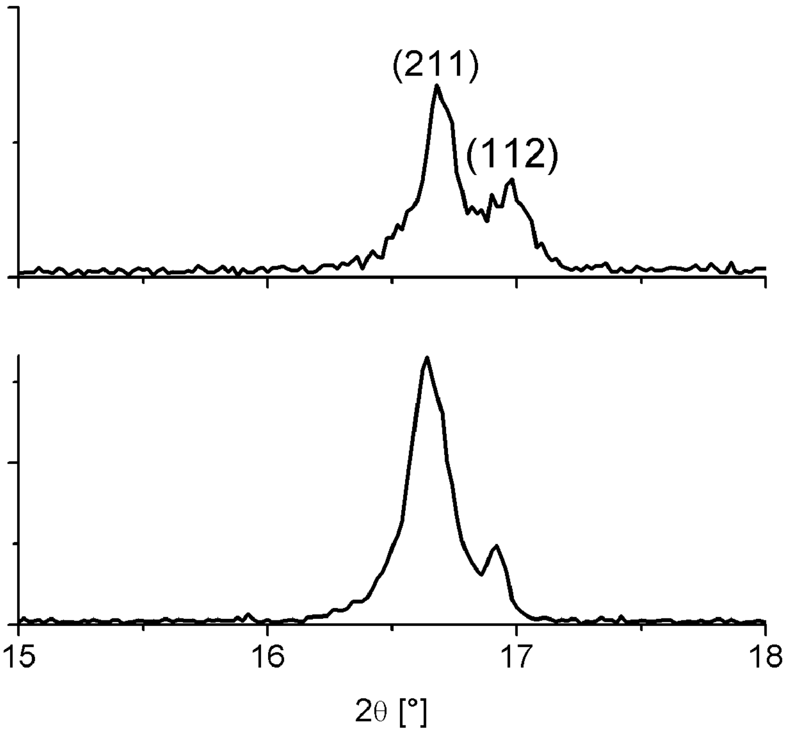
FIG. 3 shows Al:LLZO (LLZO doped with aluminum) before (bottom) and after (top) co-sintering with a lithium nickel cobalt manganese oxide (NMC) cathode at 700° C. for 30 minutes. The (112) peak is increased in intensity compared to the (211), indicating increased fraction of the low-conductivity undesirable tetragonal LLZO phase.
Figure 4:
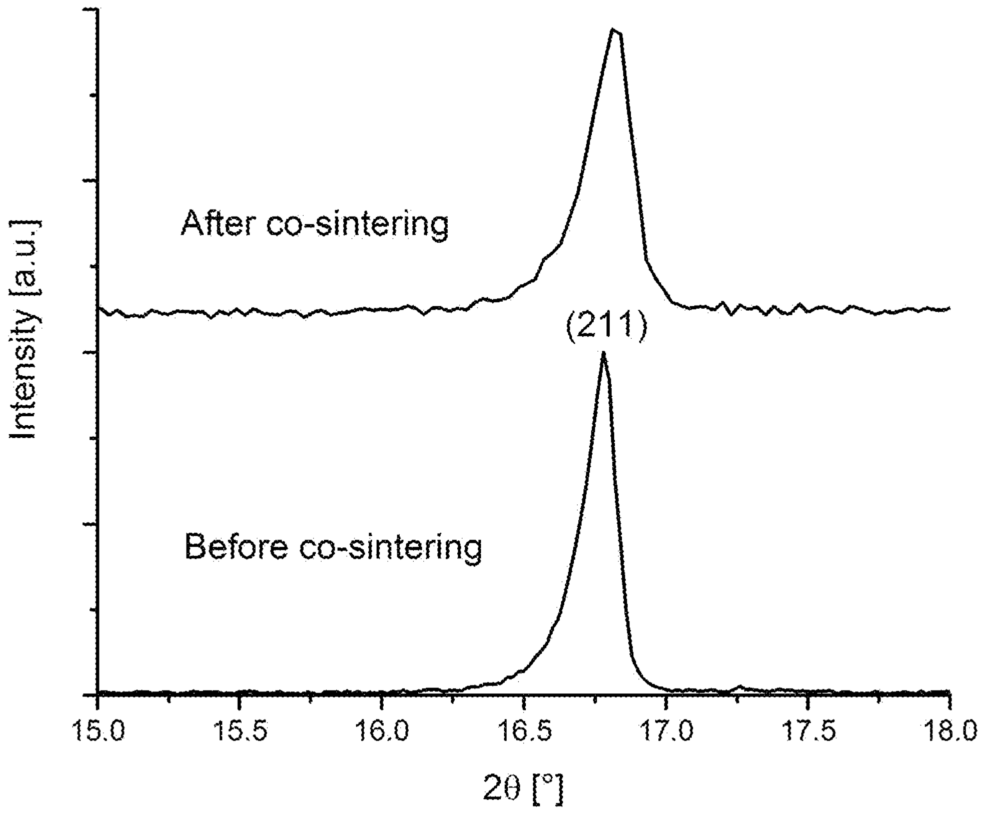
FIG. 4 shows Ta:LLZO (LLZO doped with tantalum) before (bottom) and after (top) co-sintering with lithium nickel cobalt manganese oxide (NMC) at 900° C. for 30 minutes.

FIG. 3 gives a plot of an XRD pattern for Al:LLZO before and after co-sintering with lithium nickel cobalt manganese oxide (NMC) at 700° C. The Al:LLZO was present at 51% by weight in the NMC. The (112) peak intensity increases with respect to the (211) peak after co-sintering, indicating increased tetragonal LLZO fraction. FIG. 4 gives XRD patterns for Ta:LLZO sintered with lithium nickel cobalt manganese oxide (NMC) to 900° C. The Ta:LLZO was present at 51% by weight in the NMC. Unlike Al:LLZO as shown in FIG. 3, there is no peak splitting in FIG. 4 to indicate phase transformation of the cubic LLZO phase after co-sintering.

Thus, the invention provides electrochemical devices, such as lithium ion battery composite electrodes, and solid-state lithium ion batteries including these composite electrodes and solid-state electrolytes. The composite electrodes include one or more separate phases within the electrode that provide electronic and ionic conduction pathways in the electrode active material phase. The solid state electrochemical devices have applications in electric vehicles, consumer electronics, medical devices, oil/gas, military, and aerospace.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. An electrode for an electrochemical device, the electrode comprising:

an active material phase comprising a lithium host material; and an ionic conductivity phase including a solid-state conductive material comprising a ceramic material having a crystal structure and a dopant in the crystal structure, the solid-state conductive material retaining the crystal structure during co-sintering of a uniform slurry of the lithium host material and the solid-state conductive material, wherein the electrode is a composite electrode, and wherein the solid-state conductive material has a formula of $Li_wA_xM_2Re_{3-y}O_z$ wherein w is 5-7.5, wherein A is selected from B, Ga, In, Zn, Cd, Y, Sc, Mg, Ca, Sr, Ba, Co, Fe, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0-0.75, wherein z is 10.875-13.125, and wherein the crystal structure is a garnet-type or garnet-like crystal structure, and wherein the composite electrode operates as a mixed ionic/electronic conductor without a separate phase other than the active material phase and the ionic conductivity phase that provides an electrical pathway from a current collector to electrode active material particles.

2. The electrode of claim 1, wherein the crystal structure having the dopant has a higher fraction of a cubic structure after sintering relative to the crystal structure having no dopant.

3. The electrode of claim 1, wherein the crystal structure having the dopant has a lower fraction of a tetragonal structure after sintering relative to the crystal structure having no dopant.

4. The electrode of claim 1, wherein the dopant is a transition metal cation.

5. The electrode of claim 1, wherein the dopant is pentavalent or hexavalent.

6. The electrode of claim 1, wherein the dopant comprises tantalum.

7. The electrode of claim 1, wherein the dopant comprises niobium.

8. The electrode of claim 1, wherein the dopant is present in the crystal structure at 1 to 20 weight percent based on a total weight of chemical elements in the crystal structure.

9. The electrode of claim 1, wherein the solid-state conductive material has a lithium ion conductivity that is greater than $10^{-5}$ S/cm at 23° C.

10. The electrode of claim 1, wherein the solid-state conductive material has a lithium ion conductivity that is greater than $10^{-4}$ S/cm at 23° C.

11. The electrode of claim 1 wherein:

the electrode is a cathode for the electrochemical device, and the lithium host material is selected from the group consisting of lithium metal oxides wherein the metal is one or more of aluminum, cobalt, iron, manganese, nickel and vanadium, and lithium-containing phosphates having a general formula $LiMPO_4$ wherein M is one or more of cobalt, iron, manganese, and nickel.

12. The electrode of claim 1, wherein the lithium host material has a formula $LiNi_aMn_bCo_cO_2$, wherein a+b+c=1, and wherein a:b:c=1:1:1 (NMC 111), 4:3:3 (NMC 433), 5:2:2 (NMC 522), 5:3:2 (NMC 532), 6:2:2 (NMC 622), or 8:1:1 (NMC 811).

13. The electrode of claim 1, wherein the lithium host material is selected from $LiCoO_2$, $LiNiO_2$, $Li(NiCoAl)_{1.0}O_2$, $Li(MnNi)_{2.0}O_4$, $LiFePO_4$, $LiCoPO_4$, $LiNiPO_4$, or $LiVO_3$, and any combination thereof.

14. The electrode of claim 1, wherein:

the electrode is an anode for the electrochemical device, and the lithium host material is selected from the group consisting of graphite, lithium titanium oxides, hard carbon, tin and cobalt alloy, or silicon and carbon.

15. The electrode of claim 1, wherein the solid-state conductive material and the lithium host material are co-sintered in a temperature range of 900° C. to 1400° C.

16. The electrode of claim 15, wherein the solid-state conductive material and the lithium host material are co-sintered in a temperature range of 900° C. to 1100° C.

17. The electrode of claim 1 wherein:

the lithium host material has a porous structure, and the solid-state conductive material fills at least part of the porous structure in the lithium host material.

18. The electrode of claim 1, wherein

A is selected from B, Ga, In, Zn, Cd, Y, Sc, Mg, Sr, Ba, Co, Fe, and any combination thereof.

19. The electrode of claim 1, wherein the solid-state conductive material retains the crystal structure during sintering in a temperature range of 900° C. to 1400° C. with the lithium host material.

20. The electrode of claim 1 wherein:

M is a combination of Zr and Ta.

21. The electrode of claim 20 wherein:

the solid-state conductive material has a formula of is $Li_{6.5}La_3Zr_{1.5}Ta_{0.5}O_{12}$.

* * * * *